(12) United States Patent
Mehnert

(10) Patent No.: US 12,019,414 B2
(45) Date of Patent: Jun. 25, 2024

(54) METHOD FOR GENERATING A TRAINING DATA SET FOR TRAINING AN ARTIFICIAL INTELLIGENCE MODULE FOR A CONTROL DEVICE OF A VEHICLE

(71) Applicant: Robert Bosch GmbH, Stuttgart (DE)

(72) Inventor: Jens Eric Markus Mehnert, Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 888 days.

(21) Appl. No.: 16/970,342

(22) PCT Filed: Mar. 7, 2019

(86) PCT No.: PCT/EP2019/055688
§ 371 (c)(1),
(2) Date: Aug. 14, 2020

(87) PCT Pub. No.: WO2019/175012
PCT Pub. Date: Sep. 19, 2019

(65) Prior Publication Data
US 2021/0078168 A1    Mar. 18, 2021

(30) Foreign Application Priority Data

Mar. 14, 2018  (DE) .......................... 102018203834.1
Feb. 15, 2019  (DE) .......................... 102019202090.9

(51) Int. Cl.
*G05B 17/02*    (2006.01)
*B25J 9/16*     (2006.01)
(Continued)

(52) U.S. Cl.
CPC .............. *G05B 17/02* (2013.01); *B25J 9/161* (2013.01); *B25J 9/163* (2013.01); *B25J 9/1666* (2013.01);
(Continued)

(58) Field of Classification Search
CPC . G05B 17/02; B25J 9/161; B25J 9/163; B25J 9/1666; B25J 19/023; G06T 7/55;
(Continued)

(56) References Cited

U.S. PATENT DOCUMENTS 10,725,475 B2 *  7/2020  Yang ...................... G06V 20/58
10,937,173 B2 *  3/2021  Ali Akbarian ....... G06V 10/776
(Continued)

FOREIGN PATENT DOCUMENTS

CN       106950956 A      7/2017
CN       107194409 A      9/2017
(Continued)

OTHER PUBLICATIONS

International Search Report for PCT/EP2019/055688, dated Jun. 28, 2019.

*Primary Examiner* — Jason Holloway
(74) *Attorney, Agent, or Firm* — NORTON ROSE FULBRIGHT US LLP; Gerard A. Messina

(57) ABSTRACT

A method for generating a training data set for training an artificial intelligence (AI) module. An image sequence is provided in which surroundings of a robot are recorded. A trajectory in the recorded surroundings is determined. At least one future image sequence is generated which extends to a time segment in the future, and, based on the at least one determined trajectory, encompasses a prediction of images for the event that the determined trajectory was followed during the time segment in the future. At least one subsection of the determined trajectory in the generated image sequence is assessed as positive or as negative when a movement predicted by following the trajectory corresponds to a valid movement situation, or as an invalid movement situation, respectively. The generated future image sequence with the assessment assigned thereto of the trajectory are
(Continued)

combined for generating a training data set for the AI module.

19 Claims, 2 Drawing Sheets

(51) Int. Cl.
*B25J 19/02* (2006.01)
*G06T 7/55* (2017.01)
*G06V 10/776* (2022.01)
*G06V 20/56* (2022.01)

(52) U.S. Cl.
CPC .............. *B25J 19/023* (2013.01); *G06T 7/55* (2017.01); *G06V 10/776* (2022.01); *G06V 20/56* (2022.01); *G06T 2207/20081* (2013.01); *G06T 2207/30241* (2013.01)

(58) Field of Classification Search
CPC . G06T 2207/20081; G06T 2207/30241; G06T 17/00; G06V 10/776; G06V 20/56; G05D 1/021
See application file for complete search history.

(56) References Cited

U.S. PATENT DOCUMENTS 11,126,855 B2 * 9/2021 Kim ..................... G06V 20/20
2018/0032082 A1 2/2018 Shalev-Shwartz et al.

FOREIGN PATENT DOCUMENTS

| CN | 107610464 A | 1/2018 |
| DE | 102017105628 A1 | 9/2017 |
| WO | 2018002910 A1 | 1/2018 |

* cited by examiner

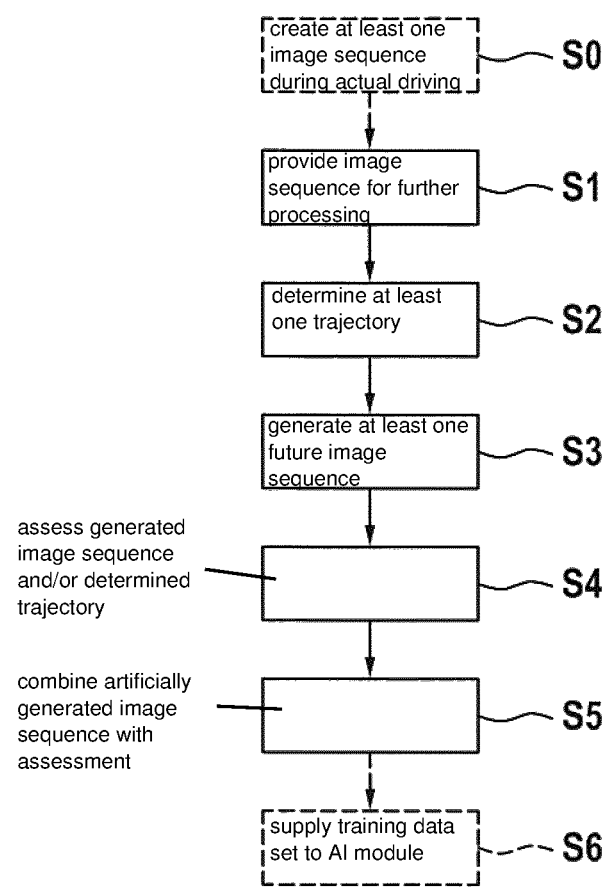

METHOD FOR GENERATING A TRAINING DATA SET FOR TRAINING AN ARTIFICIAL INTELLIGENCE MODULE FOR A CONTROL DEVICE OF A VEHICLE

FIELD

The present invention relates to the field of artificial intelligence, in particular, to a method for generating a training data set for training an artificial intelligence module, or AI module. The AI module may, for example, be implemented in a control device for a device moving in an at least semi-automated manner, such as an at least semi-autonomous robot or a vehicle driving in an at least semi-automated manner.

BACKGROUND INFORMATION

In automation technology, robotics, in autonomous driving etc., for example, artificial intelligence modules, hereafter also referred to as AI modules, are frequently used for the automated controlling of, e.g., at least semi-autonomous robots. These are based on trained data and are to ensure, e.g., during the at least semi-autonomous actual operation of the robot, a control that takes into consideration, in particular, surroundings of the robot, e.g., a roadworthy control in the case of a motor vehicle driving in an at least semi-automated manner, in that they initiate suitable responses for occurring driving events. With respect to the vehicle engineering, e.g., the vehicle is to be controlled in such a way that collisions with obstacles and/or other road users are prevented or the motor vehicle closely follows the track of the continuously changing course of the roadway.

For this purpose, such an AI module may include at least one artificial neural network, for example, which is also referred to as ANN hereafter. This ANN is trained using training data sets to gradually teach the AI module how to move, e.g., drive, autonomously in a roadworthy manner.

However, a simulator is not yet available which is able to sufficiently realistically map the surroundings and, in particular, possible robot surroundings, e.g., vehicle surroundings, to teach an, in particular, simulated robot how to move safely, e.g., to teach a motor vehicle how to drive in a roadworthy manner. For example, the computing effort would be comparatively high for such a realistic simulator since, based on the vehicle engineering, at least roads, static and dynamic objects, and also the movement behavior of the dynamic objects would have to be simulated. In practice, the surroundings are therefore reduced or simplified to a model based on which a simulation for training the AI module is created. For this purpose, for example, an ANN may be trained, which reduces the surroundings to such a simplified model. It has been found that the training success for the AI module to be trained using this reduced simulation is in need of improvement.

SUMMARY

Specific embodiments of the present invention provide an option for an improved training of an AI module as well as a use of the AI module based thereon. Advantageous refinements of the present invention are derived from the description herein, as well as the figures.

The described example method according to the present invention is suitable for generating a training data set for training an artificial intelligence module, or AI module. As an alternative or in addition, the described method may also be suitable for training an AI module. The AI module may, for example, be a software program for a computer-assisted control device of a robot, e.g., of a motor vehicle driving in an at least semi-automated manner. The AI module may be configured to generate an output for electronically activating the robot by a control device, e.g., by a control unit of the motor vehicle driving in an at least semi-automated manner, and to supply it to the motor vehicle, which is able to ascertain an evasive maneuver and/or a braking maneuver, for example, based on the output. The control device may furthermore prompt the robot, e.g., the motor vehicle, to carry out this evasive maneuver and/or braking maneuver by the activation of actuators or the like. For this purpose, the AI module may include program code and also, in particular, multilayer and/or convolutional artificial neural networks (ANN).

The example method according to the present invention may be implemented in a computer-assisted manner in, e.g., a data processing unit, which may also include at least one memory unit and one processing unit, and includes the following steps:

Initially, an image sequence is provided in which, in general, surroundings, in particular, robot surroundings, are recorded in images. In other words, the image sequence encompasses images of surroundings or an environment in which the robot may be present, move, etc. The image sequence may be recorded in advance with the aid of a vehicle, e.g., which includes an image recording unit, such as a camera, LIDAR sensors etc. In the actual driving operation, this unit may be driven through different surroundings and may create one or multiple image sequence(s), which may be provided here as an image sequence for the described method.

Then, at least one trajectory is determined, which is situatable in the robot surroundings. In this connection, a trajectory may be understood to mean a kind of space curve, i.e., a possible track or path of the robot or of another, in particular, dynamic object in or through the environment or vehicle surroundings present in the image sequence. The trajectory may be considered to be situatable when it may be considered as implementable, e.g., with respect to physical boundaries, by an assigned object, i.e., an object which is to follow the trajectory. In other words, at least one arbitrary trajectory is generated for all arbitrary objects which result from the provided image sequence of the robot surroundings recorded therein. For example, on the one hand, all possible movements (except for the limitation of the accuracy, a finite number of trajectories, i.e., different trajectory configurations) of dynamic objects may be taken into consideration, but also the movement of the robot itself relative to its surroundings.

At least one future, in particular, artificial image sequence is generated, which extends to a time segment in the future with respect to a sequence ending point in time and, based on the at least one determined trajectory, encompasses a prediction of images for the event that the determined trajectory was followed during the time segment in the future. In other words, one or multiple future image sequence(s) is/are artificially generated based on selected possible trajectories. The image sequence may also be considered as a simulation, in particular, a short-term simulation, in which the entire scene which results based on the image sequence and/or the prediction is simulated. This simulation may encompass all dynamic and non-dynamic components of the image sequence and/or of the robot surroundings recorded therein.

Then, an assessment of at least one sub-section of the determined trajectory included in the generated image sequence takes place. A result of the assessment or the assessment is positive when a movement predicted by following the trajectory corresponds to a valid movement situation, or is negative when the movement predicted by following the trajectory corresponds to an invalid movement situation. In other words, it is estimated based on the generated image sequence how features identifiable therein, such as roadway markings, slopes, or objects, such as other road users, etc., may change, move, or possibly represent an obstacle, in particular, with respect to the trajectory. For example, a dynamic object could move in the prediction from a first point A to a second point B situated along the trajectory, and then represent a potential obstacle. In the prediction, however, the trajectory could also be tangent to or intersect a roadway marking, such as a shoulder of a road. Accordingly, the predicted movement situation may be a collision with another static or dynamic object, a veering off a road, or similar situations. Based on an application in vehicle engineering, e.g., a movement situation may be understood to mean a driving event, a driving situation, etc.

For generating a training data set for the AI module to be trained, the generated future image sequence is then combined with the assessment of the trajectory assigned thereto to generate a training data set for the AI module. This means that the training data set is based on established data in the form of the image sequence or the generated future image sequence based thereon, in combination with the assessed prediction for a time segment which goes beyond the image sequence, i.e., a future time segment.

With this configuration, the described example method according to the present invention enables an improved training of an AI module since it uses a "pseudo" or "offline" driving simulator, "pseudo" or "offline" being intended to indicate here that the training data are based on a recorded image sequence of the actual surroundings, and not on a pure simulation which is simplified compared to the actual surroundings. Due to the contact with reality compared to a simplified simulation, a high training quality may be achieved. In particular, one trajectory or multiple trajectories may be determined for each object identified in the robot surroundings. The realistic scenes based thereon, in the form of images, are ideally, depending on quality, possibly indistinguishable from the provided, actually recorded image sequence. Since the trajectories of the individual objects in the robot surroundings are known as a result of the determination, a considerably improved prediction is also possible. In this way, the quality of the artificially generated image sequences may also be further improved in the future for the time segment. At the same time, the computing effort for training the AI module may be kept low since a comprehensive simulation of the vehicle surroundings is no longer required, but only a prediction for a comparatively short time segment, which accordingly requires less computing effort.

In one particularly advantageous refinement of the present invention, it is provided that the training data set is fed into the AI module. Thereafter, the generated training data set may serve as an input variable for an ANN, in particular, for an input layer thereof, and/or for a learning algorithm of the AI module, which utilizes, e.g., an approach of machine learning, such as reinforcement learning, supervised learning, etc. Due to the contact with reality of this training data set, the learning success of the AI module may occur more quickly. As a result of a processing and/or an interpretation of the training data set, the neural network of the AI module may ascertain, provide and/or output an output.

To utilize the image sequence preferably efficiently, a single image sequence may be provided, from which a plurality of training data sets are generated, determining trajectories which each differ from one another. This means that the above-described method steps which follow the provision of the image sequence are carried out repeatedly, again using this one image sequence. Thus, different trajectories are gradually determined, a respective prediction is made beyond the image sequence, the trajectories are assessed based on the respective prediction, and these findings, as described above, are combined to form training data or are generated from this combination. It is possible, e.g., that different geometric variables of the originally determined trajectory are gradually varied, i.e., for example, an angle, a curvature, etc. For this purpose, a variation of the trajectory of a dynamic object identified in the provided image sequence and/or of the robot, e.g., vehicle, from whose perspective the image sequence is generated, may be carried out, for example based on different steering angles at a constant speed, for example in 5° or, in particular, in 1° increments. At the same time, or as a further variable, it is also possible to include possible speed changes in the selection of the trajectories, for example the described steering angle changes, at simultaneous delays by a realistic delay value (for example based on the instantaneous driving situation, as a function of the robot, e.g., vehicle, its speed, and outside circumstances, such as a wetness of a roadway). In this way, multiple possible trajectories are created, which may all form the basis for the subsequent prediction of the artificially generated image sequences. It is also possible to change all further trajectories of moving objects in this way, and to incorporate them in the prediction. In this way, a finite number of trajectory configurations are created, which may all cause different predictions, so that different image sequences may be predicted or generated for each trajectory configuration.

Accordingly, in one further advantageous refinement of the present invention, at least one first training data set may be generated from the provided image sequence, based on a first determined trajectory, and a second training data set may be generated, based on a second determined trajectory. It is also possible, of course, to generate still further training data sets beyond this, the further trajectories, which together with their assessment and the image sequence are combined to form a further training set, differing from preceding trajectories in at least one feature and/or one property of the trajectory.

According to one refinement of the present invention, the generated image sequence for the respective determined trajectory may encompass a number of depth images, real images and/or images of a semantic segmentation along the same trajectory. In other words, the output for each trajectory configuration may be a number of image sequences of depth images, real images and/or images of a semantic segmentation along the same trajectory. In this way, it is possible to generate particularly realistic training data for different scenarios and/or for training different sensors, etc.

In one refinement of the present invention, the trajectory for a dynamic object included in the provided image sequence may be determined, and, based thereon, the future image sequence may be generated. In other words, a dynamic object may be identified in the provided image sequence, for which initially one or multiple different trajectory/trajectories is/are determined, and for which the future image sequences including the corresponding prediction along the particular trajectory are generated. When the trajectories of the individual objects are known, this results in a considerable improvement of the prediction, i.e., the artificially generated image sequences in the future.

According to one refinement of the present invention, the trajectory for the robot may be determined and, based thereon, the future image sequence may be generated.

To avoid unnecessary computing effort during the determination of the trajectory, a preselection of the possible trajectories may be made. The preselection of the trajectory may, for example, preferably take place based on the traffic situation, taking a predetermined probability distribution into consideration. For example, taking the instantaneous vehicle speed into consideration, which may be computationally ascertained, e.g., from the image sequence, trajectories may be discarded as unrealistic when they, based on a learned or defined probability distribution, are not situatable in the environment or vehicle surroundings recorded in the image sequence in images. A trajectory which, e.g., requires a physically not implementable lateral guidance force, which may, for example, also be determined based on a vehicle dynamics model or another computational consideration, would thus be unlikely. This trajectory would not be taken into consideration in the preselection based on the probability distribution. In this way, it is possible to achieve that the method is only carried out for such trajectories which result in a qualitatively useful training data set.

As an alternative or in addition, the determination of the trajectory may also take place by a random selection thereof based on a predetermined probability distribution. In this way, a plurality of trajectories may be randomly taken into consideration, the selection being limited to those trajectories which are at least largely realistically implementable based on the probability distribution in the surroundings or environment of the robot predefined by the image sequence. In this way, it is possible to save computing effort since the method is only carried out for such trajectories which result in a qualitatively useful training data set.

The trajectories to be determined may be preselected in that the determination only takes place for that trajectory or those trajectories which is/are implementable based on the driving situation, taking a vehicle dynamics model into consideration. It is possible, for example, that a trajectory having a curved progression in the vehicle plane has a radius which is not implementable for vehicles in general, or some vehicle types, in terms of vehicle dynamics, e.g., because the curve negotiation resulting along the trajectory can physically not be implemented. Such a trajectory may then be discarded even prior to the determination, without having to run through the method up to the assessment of the trajectory which, consequently, is only assessable as negative. The vehicle dynamics model may, e.g., be the so-called circle of forces, it also being possible to use more detailed models.

Surprisingly, it has been found that a comparatively short time segment for the prediction is already sufficient to achieve a good quality of the training data set and, at the same time, keep the computing effort low. Accordingly, in one advantageous refinement of the present invention, the time segment, beginning with or after the sequence ending point in time, for the prediction may be established with a duration between 0.5 s and 1.5 s, preferably with approximately 1 s. This duration has proven to be a good compromise between the quality of the training and the required computing effort. Moreover, it is possible to use common image processing methods having a sufficiently good prediction accuracy for such a time period.

One advantageous refinement of the present invention provides that the prediction includes at least one or multiple of the following methods: monocular depth estimation, stereo depth estimation, LIDAR data processing and/or estimation from optical flow. From the optical flow of multiple individual images of the image sequence, e.g., a prediction or a forecast for further individual images, which are no longer included in the image sequence beyond the sequence ending point in time, may take place. Depending on the method, not all individual images of the image sequences necessarily have to be processed, but only a subset thereof. These methods for depth prediction are, e.g., also available as a toolbox and may thus be procured easily and used for this purpose.

To be able to classify objects, such as obstacles or other road users, and/or features of the vehicle surroundings recorded in the image sequence, the prediction may include the generation of a semantic segmentation of at least several individual images of the image sequence. In this way, both the driving events may be predicted more accurately, and their assessment may be improved. Of course the methods of depth prediction and of semantic segmentation may be combined, so that the prediction accuracy may be improved yet again. The estimation from the optical flow may thus, for example, only be carried out for certain classes of the semantic segmentation, such as for dynamic objects.

A further advantageous refinement of the present invention provides that, during the assessment, an object recognition and/or a feature recognition obtained from the semantic segmentation is used to weight the positive or negative assessment obtained from the assessment. If the assessment, without a weighting, on an exemplary scale were, e.g., zero or −1 for a negative assessment and, e.g., +1 for a positive assessment of the predicted driving event, it is possible to distinguish between different driving events based on the object and/or feature recognition. For example, a collision with an object classified as a pedestrian could be assessed more negatively, e.g., with −1, than a driving over a curb, which could, e.g., have the value −0.7. The assessment of the less consequential collision with the curb would, in this example, thus be less negative in absolute terms than the collision with the pedestrian. This object and/or feature recognition may thus further improve the training quality of the AI module.

The example method according to the present invention is not only suitable for trajectories for an ego-vehicle from whose perspective the image sequence, or the vehicle surroundings recorded therein, is recorded when entering it. One advantageous refinement of the present invention, for example, provides that the determination of at least one trajectory, the prediction of a driving event for the time segment, and the assessment of the trajectory based on the prediction are carried out for a dynamic object identified in the image sequence, which is consequently different from the ego-vehicle. In this way, a moving pedestrian may be identified as a dynamic object, e.g., with the aid of semantic segmentation and/or prediction. Analogously to what was described above, at least one trajectory is then determined for this pedestrian, the prediction and assessment are carried out for this trajectory, and a training data set is also generated therefrom.

One particularly advantageous refinement of the present invention provides that the method described here uses the approach of the so-called reinforcement learning for training the AI module. Reinforcement learning is a conventional methodology of machine learning in which the above-described assessment is also regarded as a positive or negative reward.

As an alternative to the approach of reinforcement learning, the example method described herein, however, may also take place based on the approach of the so-called supervised learning, which, in turn, is a conventional methodology of machine learning. According to this refinement of the present invention, a positively assessed trajectory may be supplied to a supervised learning algorithm as a valid driving situation. For example, a positively assessed trajectory may be processed together with the prediction as a kind of sequence/label pair for a valid driving situation.

The present invention also relates to a data processing unit which may also include, e.g., at least one memory unit as well as a computing unit, and is configured to carry out the above-described method.

The present invention furthermore also relates to a device for controlling, in particular, a control device, at least one semi-autonomous robot, the device being configured to carry out a method described herein to select an assessed trajectory therefrom, and to activate the robot according to the selected trajectory.

Further measures improving the present invention are described hereafter in greater detail together with the description of the preferred exemplary embodiments of the present invention based on the figures.

BRIEF DESCRIPTION OF THE DRAWINGS

Exemplary embodiments of the present invention are described in detail hereafter with reference to the accompanying figures.

FIG. 2 shows a flow chart for illustrating steps of an example method according to the present invention for training an AI module.

The figures are only schematic representations and are not true to scale. In the figures, identical, identically acting or similar elements are consistently denoted by identical reference numerals.

DETAILED DESCRIPTION OF EXAMPLE EMBODIMENTS

Figure 1:
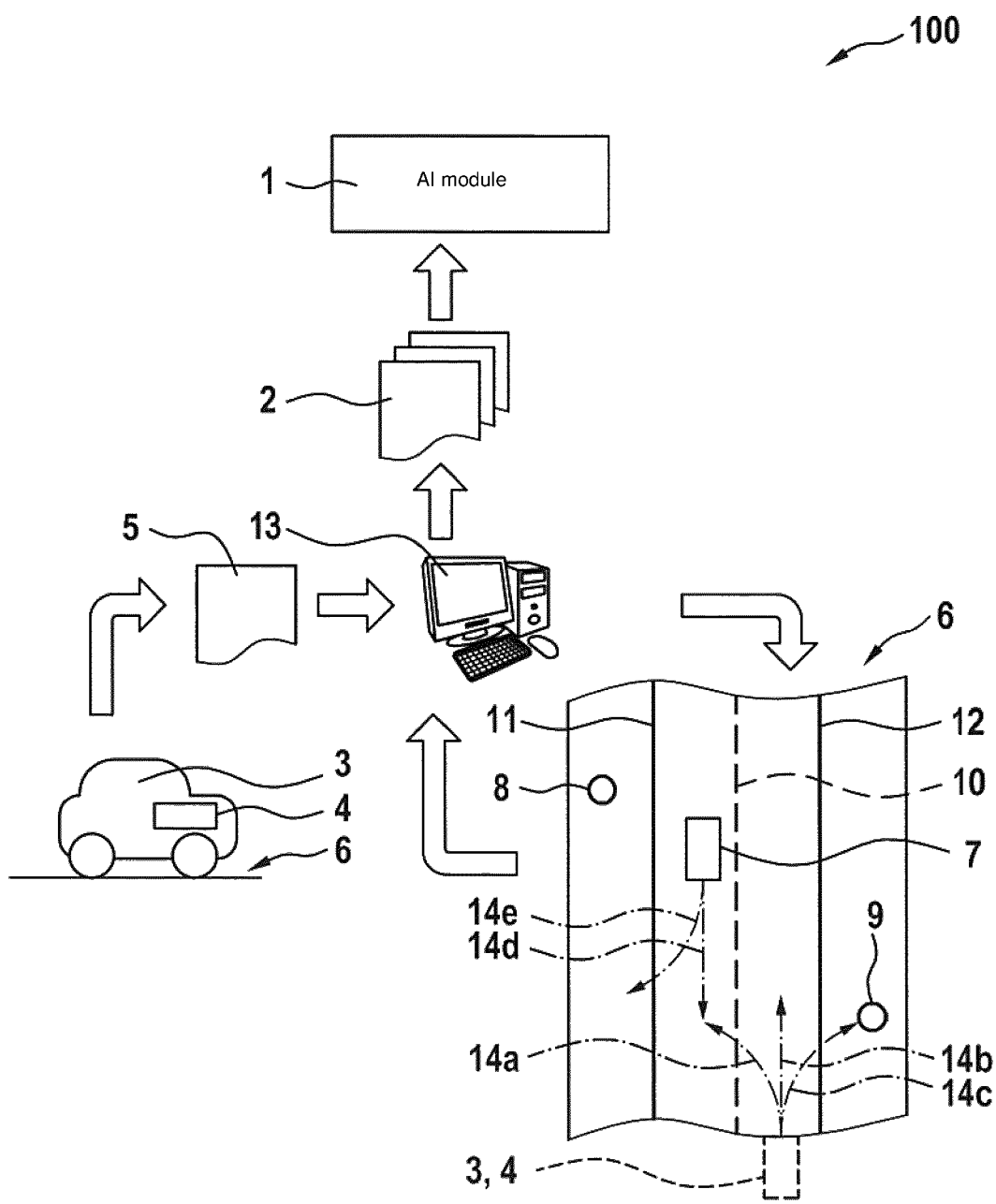
FIG. 1 shows a schematic overview of an application of an example method according to the present invention for training an AI module.

For better illustration, FIG. 1 shows a schematically represented application 100 of an example method according to the present invention for training an artificial intelligence module 1, which is referred to hereafter in short as AI module 1. It includes one or multiple multilayer ANN(s), for example, which is able to generate an output in the form of signals for a device for controlling an at least semi-autonomous robot. This output may prompt the device for controlling the robot to activate actuators and similar units to automatically carry out computer-controlled movements. The robot here, only by way of example, is a vehicle driving in an at least semi-automated manner. As an alternative thereto, the at least semi-autonomous robot may also be another mobile robot (not shown), for example one which moves by flying, swimming, diving or walking. The mobile robot may, for example, also be an at least semi-autonomous lawn mower or an at least semi-autonomous cleaning robot. One or multiple actuator(s), e.g., a drive and/or a steering system of the mobile robot, may also be electronically activated in these cases in such a way that the robot moves at least semi-autonomously.

Hereafter the robot is only described as a vehicle by way of example. As is described hereafter, AI module 1 of the vehicle is trained using a plurality of training data sets 2, which are supplied to an input layer of the ANN, for example.

In an optional step S0 (see also the flow chart in FIG. 2), the method according to the present invention for training AI module 1 initially provides that at least one image sequence 5 of vehicle surroundings 6 is created during the actual driving operation, e.g., with the aid of a vehicle 3 under real driving conditions, i.e., in the actual driving operation of vehicle 3 used for the training, with the aid of an image recording unit 4. For this purpose, image recording unit 4 includes, e.g., one or multiple camera(s), LIDAR sensor(s) etc. Image sequence 5 is then present as a video file, e.g., and may be processed accordingly in a computer-assisted manner.

In a step S1 (see also the flow chart in FIG. 2), image sequence 5, together with vehicle surroundings 6 included therein, is provided for further processing, image sequence 5 having a sequence starting point in time, i.e., the beginning of the recording of vehicle surroundings 6, and a sequence ending point in time to, i.e., the end of the recording of vehicle surroundings 6. Vehicle surroundings 6 here are a public road by way of example, e.g., a rural road, and include, by way of example, multiple static and dynamic objects 7, 8, 9 as well as multiple features 10, 11, 12, which are a road user in the form of another vehicle (=dynamic object 7), two trees at the left and right roadsides (=static objects 8, 9), and the roadway center and roadside markings (=features 10, 11, 12). For better illustration, vehicle 3 (outside vehicle surroundings 6) is also shown as an ego-vehicle here, with which image sequence 5 was established prior to its provision as a video file, and from whose perspective vehicle surroundings 6, shown in a simplified manner here, are represented.

The provided image sequence 5 is then further processed, e.g., with the aid of a data processing unit 13, which is shown by way of example in general terms in FIG. 1 as a processor or a workstation including at least one memory unit as well as a computing unit, using corresponding computing instructions. The further steps of the method described here, which are described hereafter, are also carried out with the aid of data processing unit 13.

In a step S2, for example, at least one trajectory 14a, 14b, 14c, 14d situatable in the provided vehicle surroundings is determined by, e.g., a traffic situation-based, vehicle dynamics-dependent and/or driving situation-based selection, taking a learned or defined probability distribution into consideration. Accordingly, a preselection of the trajectories is preferably made here, trajectories which are unrealistic based on the driving situation, e.g., being discarded prior to the determination in step S2. In the example shown in FIG. 1, the four trajectories 14a, 14b, 14c, 14d are determined by way of example since these [are] situatable in predefined vehicle surroundings 6 and generally also negotiable based on the driving situation, i.e., taking, for example, physical boundary conditions into consideration.

In this exemplary embodiment, trajectory 14a, which begins at the ego-vehicle here, intersects the presumable roadway of dynamic object 7, which is additionally also determined as trajectory 14d here. Trajectory 14e also begins at object 7 and leads past roadside marking 11 into, e.g., a slope of the shown road. Beginning at the ego-vehicle, trajectory 14b continues straight ahead in the same obstacle-free lane. Having the same origin, trajectory 14c leads toward object 10, i.e., a static object.

For each of these trajectories 14a through 14e, at least one future image sequence is generated in a step S3 (see also the flow chart in FIG. 2), which extends to a time segment t0+n in the future with respect to sequence ending point in time t0 and, based on the at least one determined trajectory 14a through 14e, encompasses a prediction of images for the event that the determined trajectory 14a through 14e was followed, either by the ego-vehicle or, in the case of trajectories 14d and 14e, by dynamic object 7. This means that, based on the dynamic objects, including the ego-vehicle, those trajectories 14a through 14e are calculated which are possible for these objects, i.e., possible in terms of vehicle dynamics. These trajectories 14a through 14e represent a kind of parameterization to form the image sequences of a prediction into the future, either using AI or further conventional prediction methods. The output for each of trajectories 14a through 14e are artificially generated image sequences of depth images, real images and/or images of a semantic segmentation along the same trajectory 14a through 14e in each case. In this way, the entire scene of the particular image sequence is simulated, a preferably large number of, or all, dynamic and non-dynamic components of the robot surroundings recorded in image sequence 5 being included. The simulation of the image sequence takes place in different ways, namely as a semantic segmentation including multiple images, as an actual image including multiple images and/or as a depth image including multiple images.

However, only a comparatively short time segment t0+n is considered in the process, which begins at or after sequence ending point in time t0 and extends from there into the future by, e.g., 0.5 s to 1.5 s. Depending on the accepted computing effort, however, it is also possible to predict longer time segments using the prediction methods explained hereafter so that the considered time segment t0+n may also be extended. In this exemplary embodiment, time segment t0+n, however, is established at 1 s, which has proven to be advantageous for numerous practical cases with respect to the computing effort and achievable benefit.

For the prediction of the image sequence, the provided image sequence 5 is further processed using suitable image processing methods and/or prediction methods, which are available as software packages or the like, in a computer-assisted manner in data processing unit 13, using the determined trajectories 14a through 14e as a kind of parameter.

To make a preferably exact prediction for future movement situations, such as driving events, a classification of objects 7, 8, 9 and of features 10, 11, 12 may take place into, e.g., these two classes or, even more precisely, into the classes vehicle, tree, roadway center, and roadside marking. This classification may also encompass suitable methods for the semantic segmentation, which are generally conventional and may be pixel- or voxel-based, e.g., similar regions, i.e., for example, all adjoining pixels, in terms of content, of the particular object 7, 8, 9 being combined into regions which are coherent in terms of content.

As an alternative or in addition to the semantic segmentation, a prediction of the images suitable for this purpose and/or a depth prediction is/are carried out, for example, based on image sequence 5. The depth prediction preferably includes a monocular or stereo depth estimation, an estimation from the optical flow and/or a LIDAR estimation, e.g., through the use of a Kalman filter, based on several or all individual images of image sequence 5 or similar methods. The depth prediction uses, e.g., an ANN, in particular, an autoregressive convolutional neural network, which autoregressively makes a prediction for time segment t+n from the given individual images of image sequence 5 beyond sequence ending point in time to. From a practical point of view, image sequence 5 at sequence ending point in time t0 may serve as an input variable for a prediction at point in time t0+1, the prediction obtained therefrom at point in time t0+1 (which is already in the considered time segment t0+n and therefore is no longer included in image sequence 5) may, in turn, serve as an input variable for a further prediction at point in time t0+2, etc., to make a prediction until point in time t0+n, i.e., across the entire time segment to be predicted. Moreover, however, other prediction methods are also possible, whose description at this point is dispensed with for the sake of clarity. A possible change of the vehicle surroundings along and/or adjoining the respective trajectory 14a through 14e is thus estimated for time segment t0+n.

In this exemplary embodiment, the result of the forecast or of the prediction may be that the driving event related to trajectory 14a is a collision with the moving, i.e., dynamic, object 7. This is easily comprehensible based on FIG. 1 since trajectories 14a and 14d shown as dotted lines intersect there. Trajectory 14d determined for object 7, considered on its own, continues straight ahead and, in principle, signifies an undisturbed continued travel for object 7. With respect to ego-vehicle 3, however, trajectory 14d, as explained above, intersects trajectory 14a of ego-vehicle 3 and thus presumably leads to the collision therewith. However, it shall be noted that the explicit determination of trajectory 14d is not absolutely necessary for this prediction, but the movement of object 7 may also be estimated directly from the prediction. In contrast, the predicted driving event based on trajectory 14b would, in principle, be an undisturbed continued travel. In contrast, the predicted driving event based on trajectory 14c would be a collision with static object 9.

In a step S4 (see also the flow chart in FIG. 2), the respective generated image sequence and/or at least a sub-section of the determined trajectory 14a through 14e included therein is/are assessed. The respective sub-section or the entire trajectory 14a through 14e is assessed as positive when the predicted movement situation, e.g., the predicted driving event, (cf. steps S3 and S4, see also FIG. 2) corresponds to a valid movement situation, e.g., valid driving situation. In contrast, the respective sub-section or the entire trajectory 14a through 14e is assessed as negative when the predicted movement situation, e.g., the predicted driving event, corresponds to an invalid movement situation, e.g., invalid driving situation.

In this exemplary embodiment, trajectory 14a, or the following or negotiation thereof, is assessed negatively as an invalid driving situation due to the collision with object 7 predicted therefor. Trajectory 14c is also assessed negatively as an invalid driving situation since here again a collision with object 9 is predicted. Trajectory 14e based on object 7 is also to be assessed as negative since feature 11, as a boundary marking of the roadway, is driven over here, and object 7 would veer off the roadway in this case. However, trajectory 14b is assessed positively for the ego-vehicle, and trajectory 14d is assessed positively for object 7, in which clear straight-ahead driving is to be expected, and this corresponds to a valid driving situation.

It is notable that the assessment takes place in a positively and negatively weighted manner, i.e., may also be relativized. In this exemplary embodiment, trajectory 14a, due to the severity of the collision with another road user (=object 7), is assessed more negatively than trajectory 14c, which, while it also results in a collision, does not, e.g., affect another road user, or possibly may also offer a longer stopping distance etc. Accordingly, the respective assessment of the driving event may thus be weighted according to the degree of the particular validity or invalidity of the driving situation.

In a step S5 (see also the flow chart in FIG. 2), the artificially generated image sequence including the prediction from step S3 for the particular trajectory 14a through 14e is combined with the respective assessment from step S4 using corresponding computing instructions in data processing system 13. Training data set 2 is then generated with or from this combination, which is consequently made up of, in principle, established data, namely image sequence 5, and the image sequence based thereon including the prediction for the particular trajectory 14a through 14e for time segment t0+n as well as the respective assessment thereof. Training data set 2 generated from this combination thus corresponds to a kind of pseudo-driving simulator, which is based on real vehicle surroundings 6 of image sequence 5 and encompasses artificially generated image sequences, in which preferably many different movements of dynamic objects, including ego-vehicle 3 moving relative to the surroundings, are taken into consideration. The output for each trajectory 14a through 14e are image sequences of depth images, real images and/or images of a semantic segmentation along the same trajectories.

In an optional step S6 (see also the flow chart in FIG. 2), this training data set 2 from step S5 is supplied to AI module 1 as, e.g., input variable(s) of its ANN, i.e., for example, its input layer, or its other learning algorithm and is fed there. It is provided in the process that training data set 2 is used for machine learning using an approach for reinforcement learning, to train the ANN of AI module 1 using this approach.

FIG. 2 shows the sequence of the method according to the present invention including optional step S0, steps S1 through S5, and optional step S6 in the form of a flow chart. It is notable that this training method takes place for AI module 1, as explained above, based on recorded image sequences in combination with a prediction, obtained from the image sequence, for a predetermined time segment t0+n going beyond the image sequence.

Proceeding from the shown embodiment, the method according to the present invention may be modified in many respects. It is possible, for example, that, in optional step S6, the assessment is not used for the above-described reinforcement learning, but is used together with the artificially generated image sequence or prediction as a sequence/label pair for a valid driving situation for training a supervised learning algorithm. It is furthermore possible that the above-described method is carried out in real time by a device for controlling a robot, e.g., a control unit in a vehicle etc., and based on the assessment of the different trajectories which are assessed based on the above-described method, a trajectory is selected, and the robot is electronically activated for moving according to the selected trajectory.

What is claimed is:

1. A method for generating a training data set for training an artificial intelligence (AI) module, comprising the following steps:
   providing an image sequence in which surroundings of a robot are recorded;
   determining at least one trajectory which is situatable in the recorded surroundings of the robot;
   generating at least one future image sequence which extends to a time segment in the future with respect to a sequence ending point in time, and, based on the at least one determined trajectory, encompasses a prediction of images for a future event that the determined trajectory is followed during the time segment in the future;
   assessing at least one sub-section of the determined trajectory included in the generated image sequence as positive when a movement predicted by following the determined trajectory corresponds to a valid movement situation, or as negative when the movement predicted by following the determined trajectory corresponds to an invalid movement situation, wherein the valid movement situation encompasses a collision-avoiding and/or road-following continued movement along the determined trajectory, and the invalid driving situation encompasses a veering off a roadway and/or a departure from a lane and/or a collision with another object; and
   combining the generated future image sequence with the assessment assigned to the determined trajectory for generating a training data set for the AI module;
   training the AI module using the generated training data set.

2. The method as recited in claim 1, wherein the training of the AI module includes the following step:
   feeding the generated training data set into the AI module.

3. The method as recited in claim 1, wherein only a single image sequence is provided, and multiple trajectories which each differ from one another are generated from which a multitude of future image sequences is generated.

4. The method as recited in claim 1, wherein the generated image sequence for the determined trajectory encompasses a number of: (i) depth images, and/or (ii) real images and/or (iii) images of a semantic segmentation, along the same trajectory.

5. The method as recited in claim 1, wherein the trajectory is determined for a dynamic object included in the provided image sequence and, based the determined trajectory, the future image sequence is generated.

6. The method as recited in claim 1, wherein the trajectory is determined for the robot and, based on the determined trajectory, the future image sequence is generated.

7. The method as recited in claim 1, wherein, prior to the determination, a preselection of the trajectory situatable in the surroundings is made, based on a predetermined probability distribution.

8. The method as recited in claim 1, wherein the determination is only made for the one trajectory or multiple trajectories which are implementable based on a driving situation, and is based on an assigned vehicle dynamics model of the robot configured as a vehicle.

9. The method as recited in claim 1, wherein the time segment is established with a duration between 0.5 s and 1.5 s.

10. The method as recited in claim 1, wherein the time segment is established with a duration of 1 s.

11. The method as recited in claim 1, wherein the prediction includes at least one or multiple of the following methods: monocular depth estimation, stereo depth estimation, LIDAR data processing, and estimation from optical flow.

12. The method as recited in claim 1, wherein the prediction includes generation of a semantic segmentation of at least several individual images of the image sequence.

13. The method as recited in claim 12, wherein, during the assessment, an object recognition and/or a feature recognition obtained from the semantic segmentation is used to weight the positive or negative assessment.

14. The method as recited in claim 1 further comprising:
generating signals, based the trained AI module, for controlling a robot; and
controlling the robot using the generated signals, including activating an actuator of the robot.

15. The method as recited in claim 14, wherein the actuator is a drive of the robot or a steering system of the robot.

16. A data processing unit for training an artificial intelligence (AI) module, which is configured to:
provide an image sequence in which surroundings of a robot are recorded;
determine at least one trajectory which is situatable in the recorded surroundings of the robot;
generate at least one future image sequence which extends to a time segment in the future with respect to a sequence ending point in time, and, based on the at least one determined trajectory, encompasses a prediction of images for a future event that the determined trajectory is followed during the time segment in the future;
assess at least one sub-section of the determined trajectory included in the generated image sequence as positive when a movement predicted by following the determined trajectory corresponds to a valid movement situation, or as negative when the movement predicted by following the determined trajectory corresponds to an invalid movement situation, wherein the valid movement situation encompasses a collision-avoiding and/or road-following continued movement along the determined trajectory, and the invalid driving situation encompasses a veering off a roadway and/or a departure from a lane and/or a collision with another object; and
combine the generated future image sequence with the assessment assigned to the determined trajectory for generating a training data set for the AI module;
train the AI module using the generated training data set.

17. A device for controlling an at least semi-autonomous robot, the device being configured to:
provide an image sequence in which surroundings of a robot are recorded;
determine at least one trajectory which is situatable in the recorded surroundings of the robot;
generate at least one future image sequence which extends to a time segment in the future with respect to a sequence ending point in time, and, based on the at least one determined trajectory, encompasses a prediction of images for a future event that the determined trajectory is followed during the time segment in the future;
assess at least one sub-section of the determined trajectory included in the generated image sequence as positive when a movement predicted by following the determined trajectory corresponds to a valid movement situation, or as negative when the movement predicted by following the determined trajectory corresponds to an invalid movement situation, wherein the valid movement situation encompasses a collision-avoiding and/or road-following continued movement along the determined trajectory, and the invalid driving situation encompasses a veering off a roadway and/or a departure from a lane and/or a collision with another object;
combine the generated future image sequence with the assessment assigned to the determined trajectory for generating a training data set for an artificial intelligence (AI) module;
train the AI module using the generated training data set;
select an assessed trajectory using the trained AI module; and
activate the robot according to the selected trajectory.

18. The data processing unit according to claim 16, where the data processing unit is further configured to:
generate signals, based the trained AI module, for controlling a robot; and
control the robot using the generated signals, including activating an actuator of the robot.

19. The data processing unit according to claim 18, wherein the actuator is a drive of the robot or a steering system of the robot.

* * * * *